Oct. 12, 1971    G. A. CARKHUFF    3,611,673

MATERIAL VOLUME SENSING DEVICE

Filed May 19, 1969

INVENTOR
GEORGE A. CARKHUFF

BY *Stowell and Stowell*

ATTORNEYS.

United States Patent Office 3,611,673
Patented Oct. 12, 1971

3,611,673
MATERIAL VOLUME SENSING DEVICE
George A. Carkhuff, Somerville, N.J., assignor to Research-Cottrell, Inc., Bridgewater Township, Somerset County, N.J.
Filed May 19, 1969, Ser. No. 825,802
Int. Cl. B65b 1/24, 3/26, 57/10
U.S. Cl. 53—74
1 Claim

ABSTRACT OF THE DISCLOSURE

A discharge volume sensing device for a material processing apparatus having a reciprocal feeding ram. A movable material receiving support is biased to a normal position against the load of material discharged thereon and is deflected by the ram when the volume of material thereon reaches a predetermined level. Deflection of the support is sensed by a switch associated therewith.

BACKGROUND OF THE INVENTION

This invention relates generally to discharged material sensing devices and more particularly to a sensing device used to gauge the volume of material discharged from compacting devices.

Although described particularly as applied to refuse compacters, it should be understood that this invention can be utilized in conjunction with any material processing device wherein the volume of discharge material must be gauged.

In the prior art, it is common to provide means to weigh material discharged from processing apparatus by means of scales or like devices and to feed the sensed value to suitable control means for operating on, advancing or removing the discharge material when the desired weight is attained. In some circumstances, however, the weight of the discharged material can vary widely. Prior art weight sensing devices therefore are not suitable for use in handling material discharged in these instances, since consistent actuation cannot be achieved due to the variations in weight. Sensing devices of this type are required where operation of the machine must be interrupted after discharge of a predetermined volume of compacted material or when used with suitable receptacle changing apparatus to operate such changing devices and substitute empty receptacles for filled receptacles.

SUMMARY OF THE INVENTION

This invention provides a receptacle changing sensor for material feeding devices which overcomes the disadvantages of the prior art by sensing discharged volume of material.

In a preferred embodiment, this invention provides a sensor for material processing devices which have a receptacle feeding ram, the sensor including a material receiving support coaxial and normal to the stroke of the ram and disposed in spaced relationship to the maximum extension thereof; the support is movable parallel to the stroke between a normal position and a displaced position; means to bias the support in a normal position against the displacing weight of material disposed thereon; and a switch associated with the support to be opened in the normal position and closed in the displaced position such that the ram, upon discharge of sufficient material to fill the space between the maximum extension thereof and the support, moves the support to the displaced position to close the switch independent of the weight of material disposed thereon.

These and other advantages and objects of the invention will become better understood to those skilled in the art by reference to the following detailed description when viewed in light of the accompanying drawing wherein like components throughout the figures thereof are indicated by like numerals and wherein:

DETAILED DESCRIPTION OF THE PREFERRED EMBODIMENT

Figure 1:
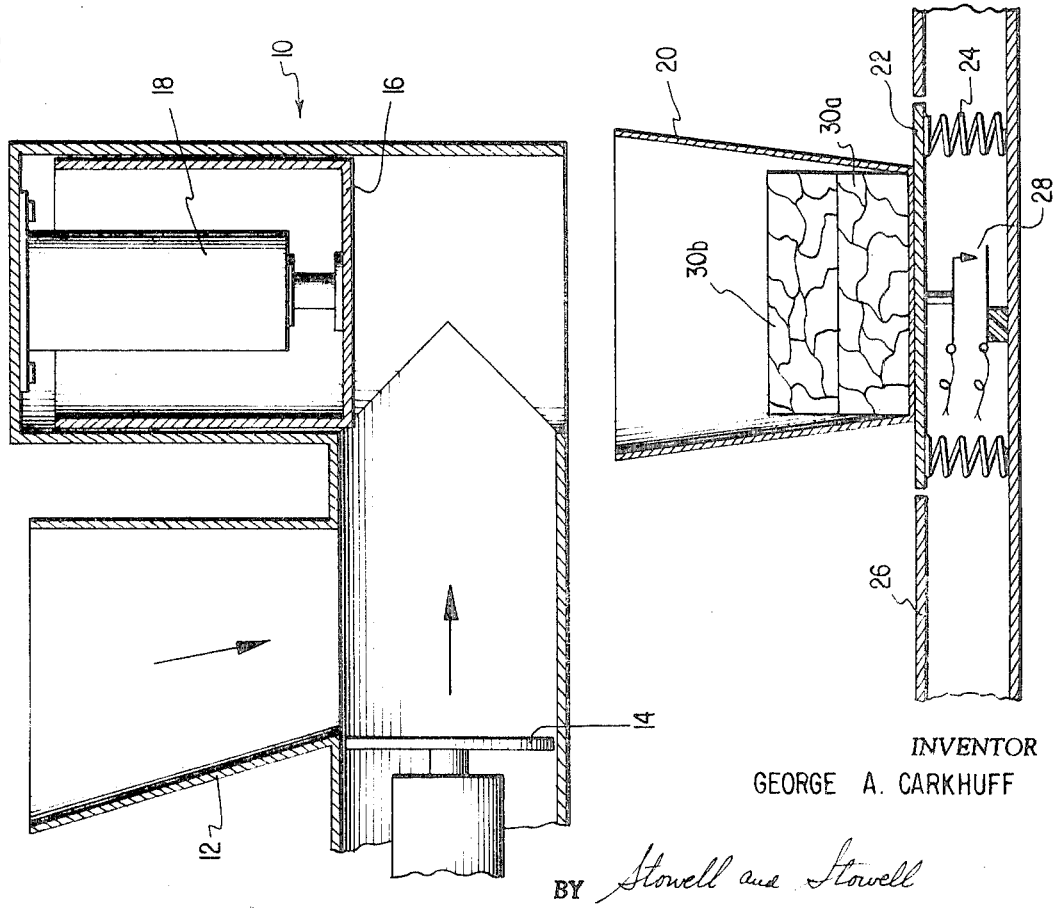
FIG. 1 is an elevational view in section showing a device in accordance with the invention in a first mode of operation thereof.

Referring now to FIG. 1 of the drawing, a refuse compacter shown generally at 10 comprises a feed hopper 12, a horizontal ram 14 and a vertical ram 16. Although, in this description, the compacter has a duel ram actuation, obviously any suitable compacting device having a ram actuated discharge means can be used for the purposes. The vertical ram 16, actuated by a hydraulic cylinder 18, is illustrated in a retracted position to which compacted refuse is fed by the horizontal ram 14.

A container 20 is disposed beneath the discharge of the compacter 10 on a platform 22. The platform is biased in an upward direction by springs 24, preferably to a position flush with the surrounding floor 26 as illustrated. A switch 28, having one contact fixed with respect to the floor 26 and the other contact mounted to the platform 22, is disposed in a normally open position when the platform is in the upward position illustrated. The compacter, during each cycle of operation, discharges a single slug of compacted refuse. Two slugs of refuse 30a and 30b are shown disposed in the container 20 after two cycles of operation of the compacter. The springs 24 are selected with sufficient strength to remain undeflected under any predicted load imposed by the weight of compacted slugs.

Figure 2:
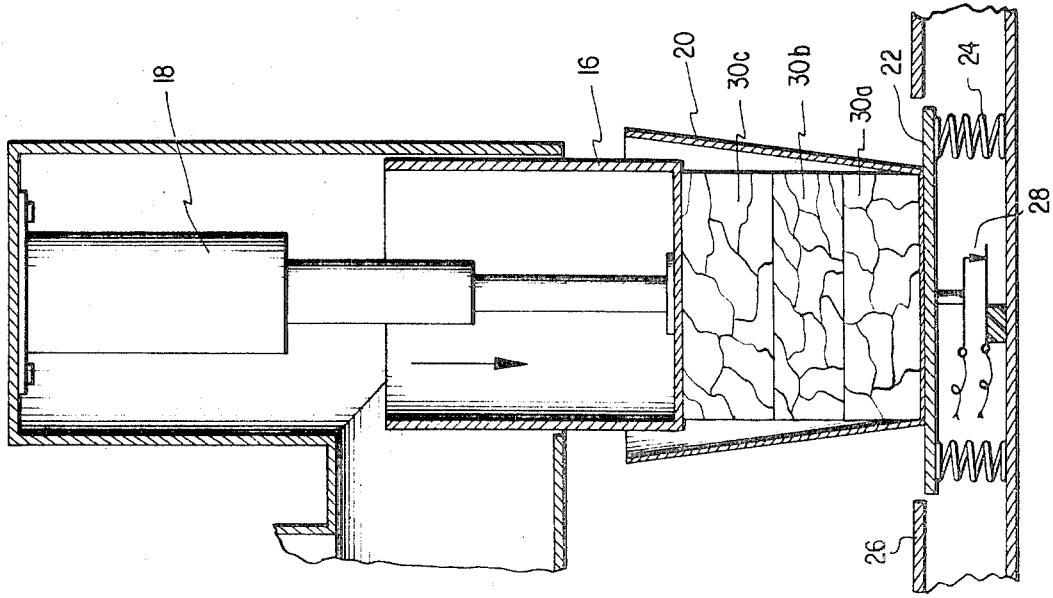
FIG. 2 is a view similar to FIG. 1 showing the device in another mode of operation thereof.

In FIG. 2, the compacter 10 is illustrated with the ram 16 disposed in the fully extended position after a third cycle of operation and with the container 20 filled with a third slug of compacted material 30c. In this configuration, since the space between the maximum extension of the ram 16 and the platform 22 is more than that occupied by the slugs, the platform is displaced downwardly against the bias of the springs 24 by the action of the cylinder 18 positioning the ram 16 to its fullest extent, thereby closing the switch 28.

The device thereby provides a sensor actuated solely by volumetric condition independent of the weight of the discharged material.

The signal from the switch 28 can be channelled to a controller (not shown) for either terminating the cycling of the compacter 10 or it can be used to initiate the operation of an automatic receptacle positioning apparatus such, for example, as a conveyor belt or the like.

It should also be understood that, with provision of sufficient strength in the springs 24 and extension of the stroke of the ram 16, the apparatus can also produce a final compaction step in the container 20 during the portion of the cycle illustrated in FIG. 2.

In addition to its independence of weight of the material, the sensor of this invention is also independent of the physical size of each individual batch or load of material, the sensor operating on the final volumetric characteristics of the material in the container. The invention, therefore, can be used in conjunction with devices having variable volume output characterisitcs. The switch 28 may consist of any type known in the art such, for example, as electric, air, oil or mechanical switching devices.

What has been set forth above is intended to be illustrative to enable those skilled in the art in the practice of the invention. It should therefore be understood that, within the scope of the appended claim, the invention may be practiced other than as specifically described.

What is new and therefore desired to be protected by Letters Patent of the United States is:

1. In a material processing apparatus having a ram arranged for movement to compact and eject one or more slugs of compacted material into a transportable container and means for moving the ram relative to the container; an apparatus for sensing and indicating when the volume of material being fed into the container reaches a substantially predetermined level comprising;

(a) a support member for supporting the container, said support member being spaced apart from the maximum extended position of said ram in its reciprocating stroke by a distance substantially corresponding to the predetermined volume of material in said container, said support member being centered on the axis of ram motion and movable in the direction of ram travel between a normal position and a displaced position;

(b) means for mounting said support member so as to maintain said support member substantially in the normal position as said container is being filled and compacted by the ram and to yield when said ram presses a predetermined volume into the container so as to permit said support member to move to a displaced position; and, (c) electrical contact means carried by said support member to provide a control signal for controlling a subsequent operation of said apparatus when said support member moves into its displaced position, whereby said ram, upon compacting and discharging into said container material at least great enough in volume to fill the container to a predetermined level, moves said support member to its displaced position and thereby actuates the contact making means to provide the control signal for said apparatus.

References Cited

UNITED STATES PATENTS

| 96,455 | 11/1869 | Mattison | 141—73 |
| 1,078,971 | 11/1913 | Thomas | 141—80 |
| 2,286,130 | 6/1942 | Vergobbi | 141—80 |
| 2,438,811 | 3/1948 | Le Sage | 53—74 X |
| 2,636,654 | 4/1953 | Sykes | 53—74 X |

FOREIGN PATENTS

| 485,514 | 8/1952 | Canada | 53—74 |
| 601,091 | 4/1948 | Great Britain | 141—80 |
| 1,053,867 | 1/1967 | Great Britain | 53—59 W |

WAYNE A. MORSE, JR., Primary Examiner

U.S. Cl. X.R.

53—59 R, 124 B; 93—59 ES; 141—192